United States Patent
Harris et al.

(10) Patent No.: US 11,708,229 B2
(45) Date of Patent: Jul. 25, 2023

(54) CAR DUMPER DUST CONTROL SYSTEM

(71) Applicant: Air-Cure, Incorporated, Minneapolis, MN (US)

(72) Inventors: Michael R. Harris, Andover, MN (US); Jason Santers, Ramsey, MN (US)

(73) Assignee: Air-Cure Incorporated, Minneapolis, MN (US)

( * ) Notice: Subject to any disclaimer, the term of this patent is extended or adjusted under 35 U.S.C. 154(b) by 0 days.

(21) Appl. No.: 17/689,592

(22) Filed: Mar. 8, 2022

(65) Prior Publication Data
US 2022/0185604 A1     Jun. 16, 2022

Related U.S. Application Data

(63) Continuation of application No. 16/939,110, filed on Jul. 27, 2020, now Pat. No. 11,332,328, which is a continuation of application No. 16/249,584, filed on Jan. 16, 2019, now Pat. No. 10,759,615, which is a continuation of application No. 15/414,299, filed on Jan. 24, 2017, now Pat. No. 10,189,657, which is a continuation of application No. 14/800,851, filed on Jul. 16, 2015, now Pat. No. 9,604,800, which is a continuation of application No. 14/045,401, filed on
(Continued)

(51) Int. Cl.
| | |
|---|---|
| *B65G 69/18* | (2006.01) |
| *B65G 67/42* | (2006.01) |
| *B65G 67/50* | (2006.01) |
| *B65G 53/66* | (2006.01) |

(52) U.S. Cl.
CPC .......... *B65G 69/186* (2013.01); *B65G 53/66* (2013.01); *B65G 67/42* (2013.01); *B65G 67/50* (2013.01)

(58) Field of Classification Search
CPC ..................................... B65G 67/42
USPC ....... 414/291, 359, 368, 371, 372, 419, 421; 105/241.1, 241.2, 279; 298/7; 15/345
See application file for complete search history.

(56) References Cited

U.S. PATENT DOCUMENTS

| | | |
|---|---|---|
| 3,631,816 A | 1/1972 | Miller |
| 3,646,728 A | 3/1972 | Holler, Jr. |
| (Continued) | | |

OTHER PUBLICATIONS

Air Cure Incorporated Brochure; entitled "Air Cure RF Dust Filter—Air pollution control/Low power/Simple operation", Bulletin RF-9; 8 pages, published prior to Oct. 8, 2020 (Year: 2002).
(Continued)

*Primary Examiner* — Jonathan Snelting
(74) *Attorney, Agent, or Firm* — Patterson Thuente, P.A.

(57) ABSTRACT

A method and apparatus that reduce release of dust generated during rotary dumping of rail cars in a dumping facility. The method includes removing dust laden air from a space bounded by a backside airflow diverter, a rotational frame, a first baffle and a second baffle while the rotational frame is rotating with a rail car by drawing the dust laden air through a secondary air intake that passes through the backside airflow diverter into a backside hood. A dust control apparatus includes a diverter, overlying a backside hood having a concave curved upper surface; and at least one secondary air intake positioned to pass through the diverter being located approximately where pressure in the backside hood remains neutral or negative relative to a pressure even there is a transient increase in air pressure in a lower portion of the backside hood.

19 Claims, 10 Drawing Sheets

Related U.S. Application Data

Oct. 3, 2013, now Pat. No. 9,108,809, which is a continuation of application No. 13/623,423, filed on Sep. 20, 2012, now Pat. No. 8,568,077, which is a continuation of application No. 13/101,587, filed on May 5, 2011, now Pat. No. 8,292,566, which is a continuation of application No. 12/332,826, filed on Dec. 11, 2008, now Pat. No. 7,959,398.

(56) References Cited

U.S. PATENT DOCUMENTS

| | | |
|---|---|---|
| 3,841,234 A | 10/1974 | Nicoletti |
| 4,141,299 A | 2/1979 | Friend et al. |
| 4,240,355 A | 12/1980 | Puariea |
| 4,360,369 A | 11/1982 | Niederer |
| 4,389,149 A | 6/1983 | Dancs |
| 4,407,202 A | 10/1983 | McCormick |
| 4,479,749 A | 10/1984 | Binzen |
| 4,609,321 A | 9/1986 | Binzen |
| 4,662,126 A | 5/1987 | Malcolm |
| 4,699,187 A | 10/1987 | Binzen |
| 5,017,077 A | 5/1991 | Dowden |
| 5,049,007 A | 9/1991 | Abel |
| 5,140,911 A | 8/1992 | Holland |
| 5,279,629 A | 1/1994 | Stueble |
| 5,302,071 A | 4/1994 | Binzen |
| 5,560,887 A | 10/1996 | Roy et al. |
| 5,567,105 A | 10/1996 | Williams |
| 5,727,475 A | 3/1998 | Kurtz |
| 6,089,378 A | 7/2000 | Mascheretti et al. |
| 6,192,804 B1 | 2/2001 | Snead |
| 6,960,054 B2 | 11/2005 | Hall et al. |
| 7,322,785 B2 | 1/2008 | Hall et al. |
| 7,811,041 B2 | 10/2010 | Hall et al. |
| 7,959,398 B2 | 6/2011 | Harris |
| 7,988,401 B2 | 8/2011 | Hall et al. |
| 8,292,566 B2 | 10/2012 | Harris et al. |
| 8,568,077 B2 | 10/2013 | Harris et al. |
| 8,734,080 B2 | 5/2014 | Harris |
| 10,189,657 B2 | 1/2019 | Harris |
| 10,759,615 B2 | 9/2020 | Harris |
| 2008/0085175 A1 | 4/2008 | Hall et al. |
| 2011/0255942 A1 | 10/2011 | Hall et al. |

OTHER PUBLICATIONS

Air Cure Incorporated Brochure; entitled "Dust Control Systems for coal handlers throughout the USA"; Bulletin CH-4, 6 pages, published prior to Oct. 8, 2020 (Year: 2002).

Application and File History for U.S. Appl. No. 12/332,826, filed Dec. 11, 2008. Inventors: Dennis Hall et al.

Application and File History for U.S. Appl. No. 13/101,587, filed May 5, 2011. Inventors: Dennis Hall et al.

Application and File History for U.S. Appl. No. 13/623,423, filed Sep. 20, 2012. Inventors: Michael Harris et al.

Application and File History for U.S. Appl. No. 14/045,401, filed Mar. 10, 2013. Inventors: Michael Harris et al.

Application and File History for U.S. Appl. No. 10/159,808, filed May 31, 2002. Inventors: Dennis Hall et al.

Application and File History for U.S. Appl. No. 11/235,655, filed Sep. 26, 2005. Inventors: Dennis Hall et al.

Application and File History for U.S. Appl. No. 11/981,618, filed Oct. 31, 2007. Inventors: Dennis Hall et al.

Application and File History for U.S. Appl. No. 12/822,845, filed Jun. 24, 2010. Inventors: Dennis Hall et al.

Application and File History for U.S. Appl. No. 13/170,363, filed Jun. 28, 2011. Inventors: Dennis Hall et al.

Application and File History for U.S. Appl. No. 14/224,717, filed Mar. 25, 2014. Inventors: Dennis Hall et al.

Application and File History for U.S. Appl. No. 14/800,851, filed Jul. 16, 2015. Inventors: Michael R. Harris et al.

Application and File History for U.S. Appl. No. 15/414,299, filed Jan. 24, 2017. Inventors: Michael R. Harris et al.

Application and File History for U.S. Appl. No. 16/249,584, filed Jan. 16, 2019. Inventors: Michael R. Harris et al.

Application and File History for U.S. Appl. No. 16/939,110, filed Jun. 27, 2020. Inventors: Michael R. Harris et al.

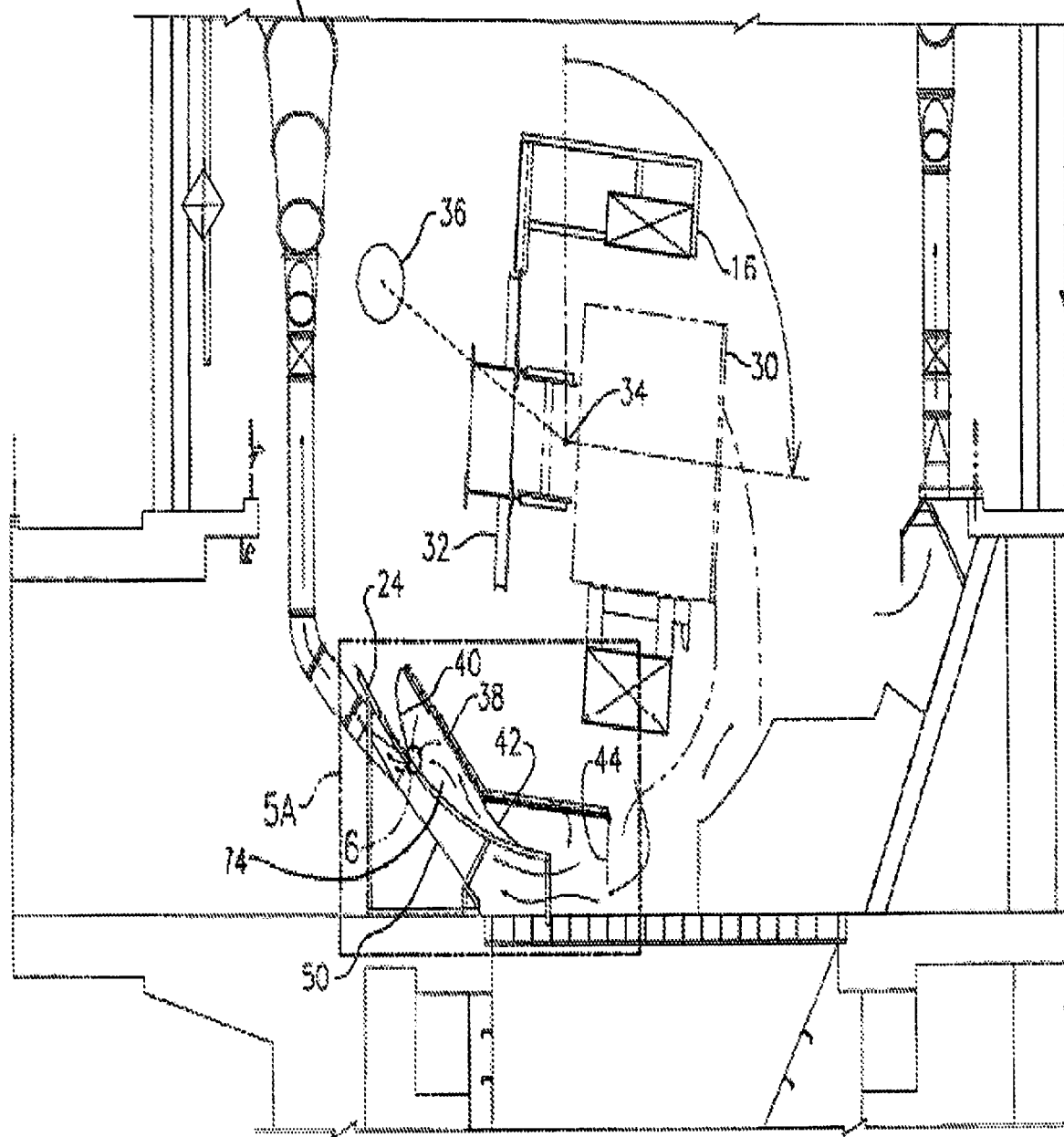

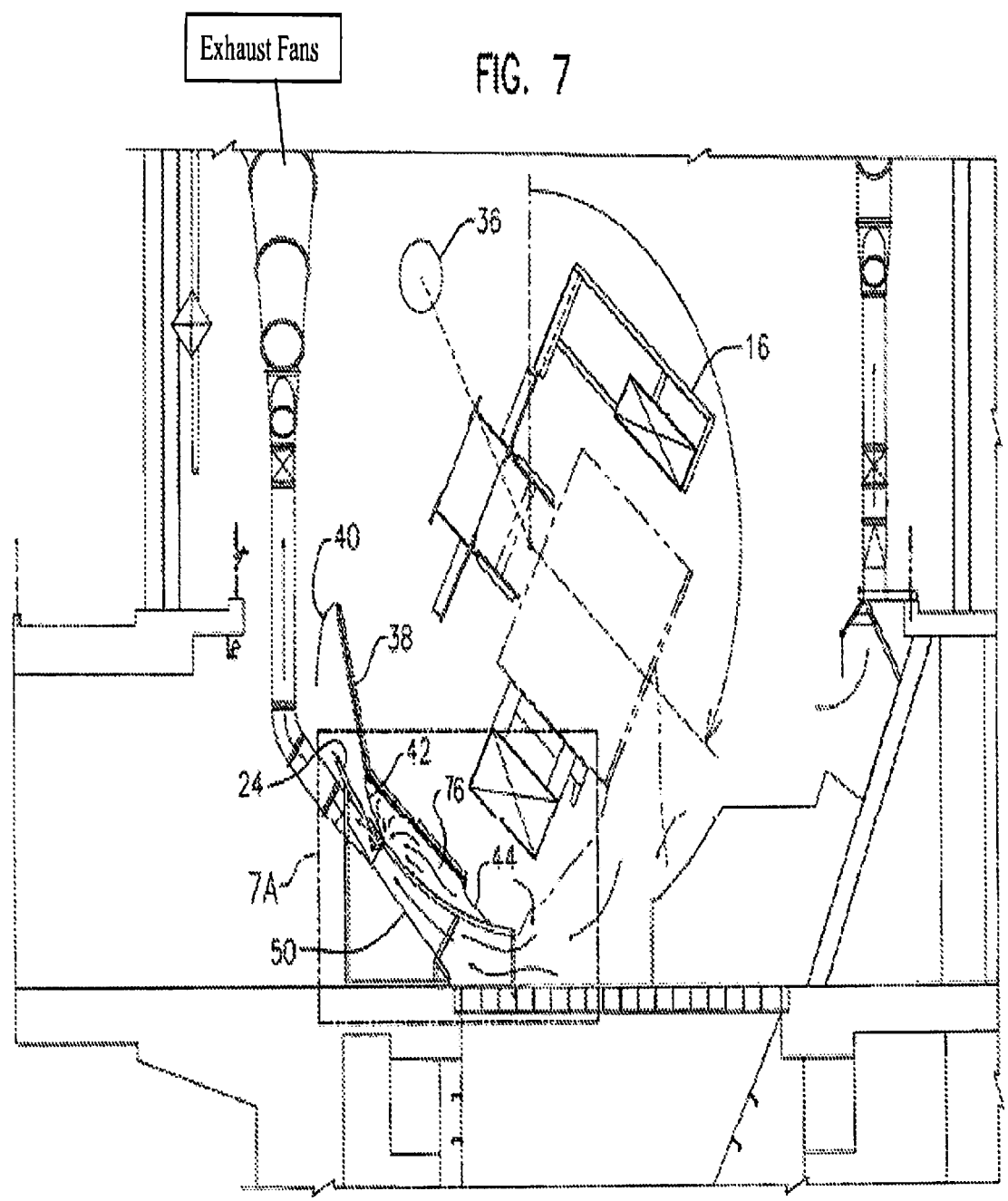

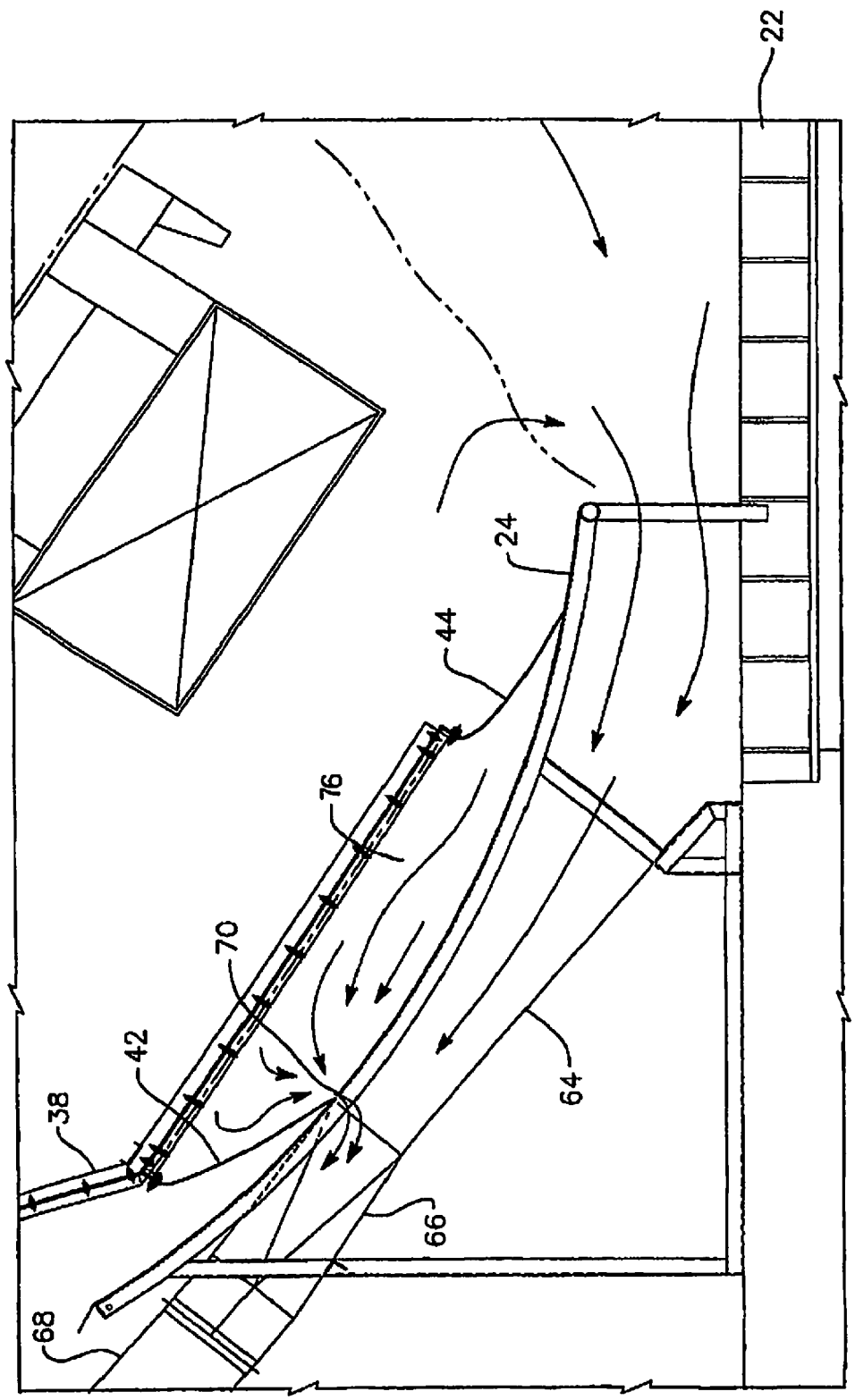

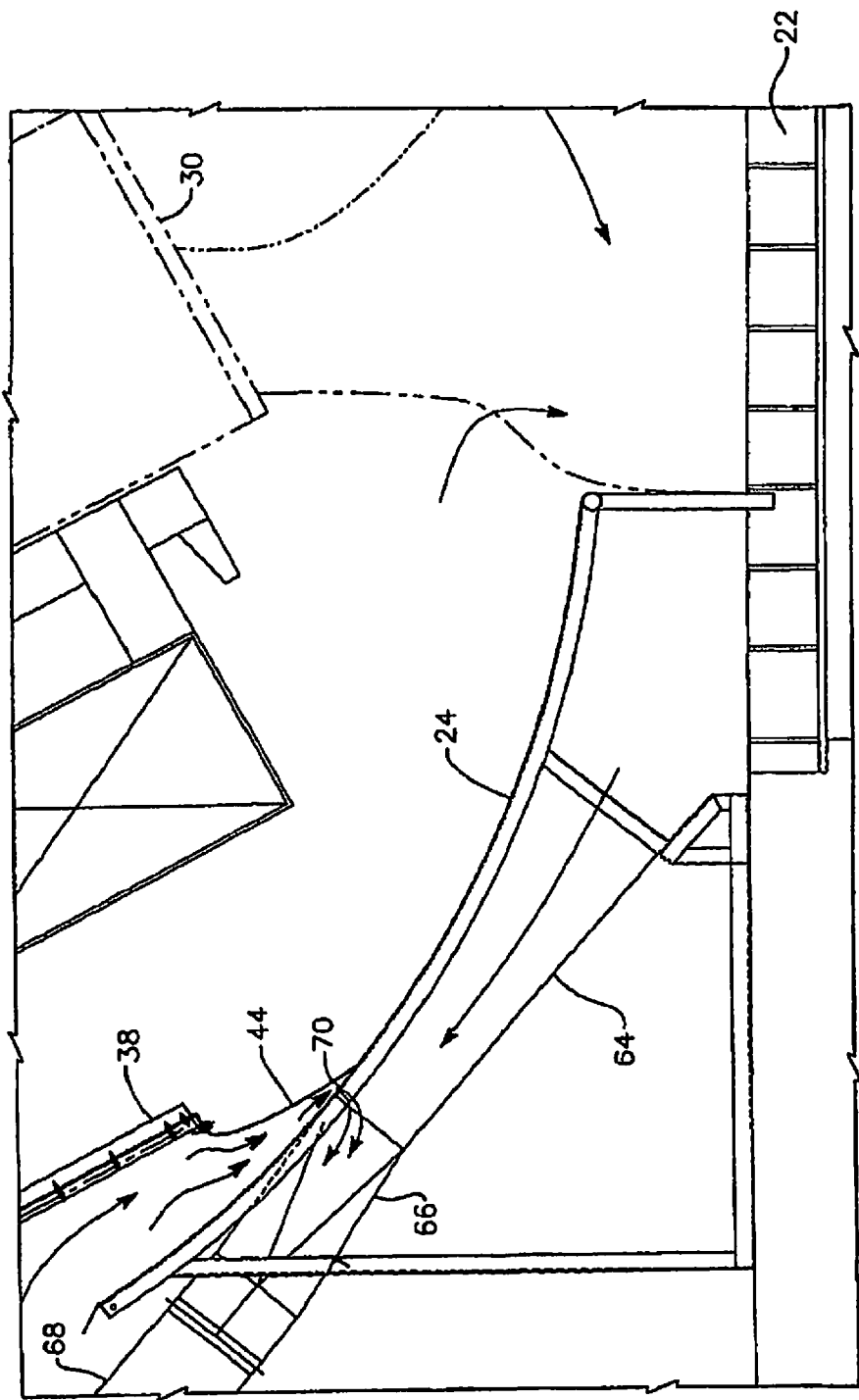

CAR DUMPER DUST CONTROL SYSTEM

CROSS-REFERENCE TO RELATED APPLICATIONS

This application is a continuation of application Ser. No. 16/939,110, filed Jul. 27, 2020, entitled "Car Dumper Dust Control System," which is a continuation of application Ser. No. 16/249,584, filed Jan. 16, 2019, now U.S. Pat. No. 10,759,615, issued Sep. 1, 2020, entitled "Car Dumper Dust Control System," which is a continuation of application Ser. No. 15/414,299, filed Jan. 24, 2017, entitled "Car Dumper Dust Control System", now U.S. Pat. No. 10,189,657, issued Jan. 29, 2019, which is a continuation of application Ser. No. 14/800,851 entitled "Car Dumper Dust Control System", filed Jul. 16, 2015, now U.S. Pat. No. 9,604,800, issued Mar. 28, 2017, which is a continuation of application Ser. No. 14/045,401 entitled "Car Dumper Dust Control System", filed Oct. 3, 2013, now U.S. Pat. No. 9,108,809, issued Aug. 15, 2015, which is a continuation of application Ser. No. 13/623,423 entitled "Car Dumper Dust Control System", filed Sep. 20, 2012, now U.S. Pat. No. 8,568,077, issued Oct. 29, 2013, which is a continuation of application Ser. No. 13/101,587, entitled "Car Dumper Dust Control System", filed May 5, 2011, now U.S. Pat. No. 8,292,566 issued Oct. 23, 2012, which is a continuation of application Ser. No. 12/332,826 entitled "Car Dumper Dust Control System", filed Dec. 11, 2008, now U.S. Pat. No. 7,959,398 issued Jun. 14, 2011, the entire contents of all of the above applications are incorporated herein by reference.

TECHNICAL FIELD

The present invention relates to rotary-dumping of material from rail cars, and more particularly, to a method and apparatus for controlling environmental contamination produced by rotary-dumping material from rail cars.

BACKGROUND

Rail cars have been used for many years to efficiently haul large quantities of bulk materials over land. Items commonly shipped include grain, iron ore and coal. Shipping such items via rail car is very efficient due to the ability to transport extremely large loads of these materials in one shipment. For example, one single rail car may hold up to 110 tons of coal and an entire train made up of such cars may be over 130 cars in length, extending 6000 feet in total length.

Once at the destination, it is necessary to unload the cargo. For bulk material such as grain, ore, or coal, bottom-dumping and rotary-dumping are commonly used. Bottom-dumping involves staging a particular car over a receiving pit and opening hatches located in the bottom of the car. The cargo exits the car though the bottom hatches or doors and proceeds into the pit below. U.S. Pat. No. 5,302,071, assigned to Svedala Industries, Inc., discloses one example of a bottom-dumping rail car.

Bottom-dumping requires the use of rail cars that are specifically designed for bottom-dumping. This is due to the need to direct the car contents to a centrally located chute on the bottom of the car. The sides of the car must be at least partially sloped to urge the contents towards the chute, or else there would be a partial retention of the material being carried. This configuration decreases the ratio of the car's size vs. cargo capacity. Additionally, the bottom-dump configured rail cars are not easily interchangeable with standard cars at a dumpsite because the dump apparatus for standard cars must be uniquely configured to accommodate bottom-dump cars. The bottom-dump rail cars are also environmentally disadvantageous, as will be described more fully below.

Rotary-dumping is the other commonly used method of unloading a rail car. In rotary-dumping, a standard rectangular rail car is staged or indexed in a rotary-dump apparatus. The apparatus then rotates approximately one-half turn, thereby dumping the contents of the car into a receiving pit. Typically, the cars of the train remain connected during the dumping process through the use of rotary couplings between each car. Such couplings permit the cars to be rotated while still connected though an axis center at the coupling. U.S. Pat. Nos. 4,479,749 and 4,609,321, both assigned to Dravo Corporation, disclose conventional rotary-dump apparatuses. In some applications, such as the dumping of coal at major power plants, cars may be rotated and emptied at the rate of one car every four minutes.

Environmental pollution is an important concern to the design of a material dumping facility. When the car's load is dumped, a large quantity of material exits the car in a very short time. The turbulence generated by the quick unloading causes fine dust particles to billow up from the receiving pit and pollute the air surrounding the dump facility. The resulting dust, such as from grain or coal, is very explosive when in sufficient density. It is also an environmental pollutant. Therefore, there is a need to provide an apparatus and method for minimizing the polluting effect of dust.

Bottom-dump apparatuses have two critical drawbacks. First, they require special cars equipped with the bottom chutes as discussed previously. Second, the dust cloud produced by bottom-dumping is recognized by those skilled in the art to be larger, more aggressive and less controllable than the cloud produced by the rotary-dump method.

Rotary-dump systems control the dust cloud by using fans with large motors to exhaust the dust-filled air surrounding the car though conduits and into filtering devices. This process requires a very high flow of air and correspondingly very large motors to drive such high capacity system. These motors are commonly several hundred horsepower. Multiple motors of this size may be required at any given installation.

The dust cloud is typically large enough and aggressive enough to overpower any reasonably sized removal system. Therefore, the airflow around the car and in the pit is controllably designed to keep the dust cloud suppressed long enough to allow the dust collection system to suck the dust from the surrounding area. The better the airflow is managed, the less horsepower is needed to drive the system. This results in greatly improved efficiency.

Prior art patents disclose a method of enclosing a rail car within a fixed enclosure. This design has several drawbacks. First, it restricts the operator's ability to observe the load as it is being dumped to ensure that the system does not malfunction and that no impurities or foreign objects are introduced into the pit. Next, the fixed enclosure requires multiple large motors to drive the plurality of air handling units. The filtering portions of the air handling units are within the dumping facility, which makes cleaning and maintenance more difficult. Finally the efficiency of the system is low due to the large motors required to produce sufficient air removal capacity because the control of the airflow around the car does not have good dust cloud retention time.

There are two different types of rotary car dumpers in common use. Those skilled in the art refer to the two types of dumpers as rings out dumpers and rings in dumpers. The rings referred to are the structural ends of a car dumper which support the entire car dumper barrel and the railcar itself. Depending upon the design of a rotary car dumper it may have the rings located at the far ends of the dumper barrel, a rings out design, or it may have the rings located approximately one quarter of the length of the barrel in from the ends, the rings in design.

When a railroad car is dumped more air is displaced by the rush of product exiting the railcar than can be evacuated by a blower system in a period of time during the dump. Thus, there is a tendency for the moving dust laden air to escape from the car dumper pit by any exit path that may be available.

Prior art car dumper dust control systems have made great improvements in dust control. However, dust still escapes from car dumpers in sufficient quantity to create significant air pollution and deposition of dust onto horizontal surfaces in the vicinity of car dumpers.

Often, attempts have been made to control the remaining escaping dust by wet suppression techniques. That is water is sprayed into the area to dampen the dust particles. This causes them to fall to the ground or other horizontal surface. Wet suppression is generally effective in removing dust from the air. Unfortunately, wet dust adheres to everything it comes into contact with in the area and is difficult to clean up.

Prior dust control systems are described in U.S. Pat. Nos. 6,960,054 and 7,322,785 which are assigned to the assignee of the present application.

Therefore, there is a continuing need to provide a rotary-dumper dust collection apparatus and system that overcomes the drawbacks of the prior art.

SUMMARY

The present invention addresses the disadvantages in the prior art and the need to provide an environmentally friendly and efficient way to unload rail cars by providing a method and apparatus for controlling dust generated by the rotary dumping of rail cars. One or more flexible baffles are provided to the back-side of a rotary dump frame to seal a portion of the material receiving pit during at least a portion of the rotary motion. The dust cloud generated by this dumping is retained in the pit for an increased time due to tumbling of the cloud induced by the baffles and other features of the facility. A plurality of intake ducts removes the dust cloud from the pit for transfer to a remote filtering facility.

The present invention provides for additional air intakes be placed at a location where they can assist in extracting dust laden air from between the baffles.

Car dumpers that have been adapted for dust control still release some dust into the environment. As will be discussed below, there is a tendency for dust to be trapped between the baffles which hang down and seal between the car dumper carriage and the ski jump or backside diverter during at least part of the dumping process. Dust trapped between the baffles tends to be released in a puff of dust when the leading baffle clears the upper outer edge of the ski jump and is no longer in contact with ski jump.

A rotary car dumping facility with relation to the present invention generally includes an interior and an exterior. Within the interior is located a material receiving pit. The pit has a dump side and a back side. A rotational frame is located at least partially in the pit and is adapted to receive a loaded rail car and to dump the load from the rail car during rotational motion of the rotational frame and the rail car. The rail car starts in an upright position where the entire load is in the rail car and is rotated by the rotational frame to a dumping position where the load exits the rail car. Inside the pit is located a backside airflow diverter, also known as a ski jump. The backside airflow diverter is located adjacent the backside of the pit and includes a curved upper surface which, because of its shape leads to being referred to as the ski jump.

The backside hood for removing contaminated air from the backside of the pit is also located on the backside of the pit generally beneath the backside diverter. The rotational frame supports one or more baffles that hang downward from the rotational frame and make contact with the upper surface of the backside airflow diverter during at least a portion of the rotational motion. The present invention is particularly useful in the context of a car dumper that has at least two baffles disposed on the rotational frame.

The baffles located on the rotational frame are separated by some distance so that as one baffle leaves the top of the backside airflow diverter, a second baffle is still in contact with the top of the backside airflow diverter and a third baffle may be making contact with the lower edge of the backside airflow diverter. Thus, there is a space located between each pair of the baffles. A first space located between the first and second baffle and a second space located between the second and third baffle.

Dust laden air often occupies the spaces between the first and second baffle and the second and third baffle. The present invention allows for the removable of the dust laden air from the space between the baffles to a filtering facility where dust and particulate matter in the dust laden air can be removed before the air is released into the surrounding environment.

For the purposes of this discussion, a car dumping facility with three curtain baffles secured to the rotational dumping frame will be discussed. However, this should not be considered to be limiting. A larger or smaller number of curtain baffles may be utilized in accordance with the present invention.

As the rotational frame begins its rotation, from an upright position, none of the curtain baffles are in contact with the upper surface of the backside airflow diverter. As the rotation continues, the first curtain baffle makes contact with the backside airflow diverter and forms a seal between the rotational frame and the backside airflow diverter. During this time period, dust laden air from the dumping process can enter the space behind the first baffle. As the rotational frame continues its rotation, the second baffle makes contact with the lower edge of the backside airflow diverter. When this contact is made, dust laden air that is in the space behind the first baffle but in front of the second baffle, is trapped in the space bounded by the rotational frame, the first baffle, the second baffle and the upper surface of the backside airflow diverter. As rotation continues, the first baffle clears the top edge of the backside airflow diverter, at this time there tends to be a puff of dust laden air that escapes from the space between the first and second baffle. In the prior art, this dust laden air is released into the environment and contributes to environmental pollution in the area surrounding a car dumper. As rotation of the car dumper continues, the second baffle remains in contact with the upper surface of the backside airflow diverter and the third baffle makes contact with the lower edge of the backside airflow diverter and continues up to the top of the backside airflow diverter. At this time dust laden air can be captured in the space bounded by the second baffle, the third baffle, the rotational frame and the upper surface of the backside airflow diverter. As rotation continues to the final dumping position, the second baffle clears the upper edge of the backside airflow diverter and a second puff of dust laden air may be released into the environment surrounding the car dumping facility. After the car is completely dumped, the rotational frame reverses its rotational direction and returns to an upright position. The present invention removes dust laden air from the space between the first and second baffle and the space between the second and third baffle prior to that dust laden air being released into the ambient environment as a puff of dust laden air.

The present invention includes at least one additional air intake that passes through upper surface of the backside airflow diverter at a location so that dust laden air can be drawn into the backside hood and removed from the space between the first and second baffle and the space between the second and third baffle before these spaces are opened to the ambient atmosphere and allow release of the dust laden air into the surrounding environment.

The additional air intakes in accordance with the present invention are located at a position relative to the backside hood where the backside hood narrows as it approached attached ductwork, thus creating a higher speed flow of air to the filter system that is utilized with the car dumper of the present invention. The additional air intake is also located so that the edge of the first baffle passes the additional air intake after the edge of the second baffle has made contact with the lower edge of the upper surface of the backside airflow diverter. This prevents the additional air intakes from drawing additional dust laden air from the pit into the space between the baffles.

Thus, dust laden air is withdrawn from the space between the first baffle and the second baffle while the rotational frame is rotating. In accordance with the present invention, the location of the additional air intake is also such that the second baffle passes the location of the additional air intake shortly after the third baffle makes contact with the lower edge of the backside airflow diverter.

In accordance with the present invention, the additional air intake is sized to allow for essentially complete evacuation of dust laden air from between the first baffle and the second baffle or the space between the second baffle and the third baffle prior to the leading baffle breaking contact with the upper edge of backside airflow diverter.

Additional air intakes in accordance with an example embodiment of the present invention, may take the form of generally horizontally oriented slits passing through the upper surface of the backside airflow diverter and into the backside hood. The additional air intakes are located aligned with at least one of the air intake ducts that are positioned beneath the backside airflow diverter. The additional air intakes may also be formed in other shapes including circular or square.

In some example embodiments of the present invention it is beneficial if the edges of the additional air intake are chamfered or rounded. Chamfering or rounding may minimize wear on the edges of the baffles as they pass over the additional air intakes.

During operation of a car dumper prior to dumping of a rail car while the exhaust fans are operating, pressure inside of the backside hood is negative relative to the inside of the pit because of the operation of the exhaust fans. When a railway car is being dumped, the solid granular material being dumped from the rail car rushes downward into the pit and carries along with it a great deal of air. This down rushing air increases pressure inside the car dumper pit for a period of time and briefly causes there to be positive pressure within at least the lower portion of the interior of the backside hood. This positive pressure reaches some distance up the backside hood toward the air intake duct work. As the backside hood narrows and transitions to the ductwork the velocity of air flow increases as a result of the fans withdrawing air thus transitioning from positive pressure to negative pressure.

Described another way, the pit is subject to spike increases in pressure initiated by the load exiting the rail car and entering the pit. The spike increases in pressure travel into the backside hood an attenuating distance from a primary hood intake before being attenuated. The attenuating distance is that distance from the primary hood intake at which the pressure within the backside hood is less than or equal to the pressure in the interbaffle space.

In an example embodiment of the invention at least one secondary air intake is positioned to pass through the upper surface of the backside diverter into the backside hood at a location at least the attenuating distance from the primary intake.

In accordance with an example embodiment of the present invention, the additional air intakes are positioned in a zone of the backside hood where there is always neutral or negative pressure relative to the inside of the pit. This positioning overcomes a tendency for dust laden air passing into the backside exhaust hood under pressure from the pit to puff out of the additional air intakes into the space between the baffles and then into the environment. Thus, in accordance with the present invention, the additional air intakes may be positioned at a location toward the upper end of the backside hood where pressure in the backside hood remains neutral or negative even when downwardly rushing material dumped from the rail car into the pit and air that accompanies it transiently increase pressure in the lower portion of the backside hood. In an example embodiment the location of the additional air intakes is near the location of the transition from the top end of the backside hood to the exhaust duct that draws air from the backside hood.

In another example embodiment, the invention includes a method of reducing release of dust generated during rotary dumping of rail cars in a dumping facility. The facility includes a material receiving pit that has a dumpside and a backside. A rotational frame is disposed at least partially in the pit and is configured to dump a load from a rail car during rotational motion of the rotational frame between an upright position wherein the load is in the rail car and a dumping position wherein the load can clear the rail car supports baffles. A backside airflow diverter is within the pit adjacent the back side of the pit. A backside hood is located generally beneath the backside diverter. The baffles each present a leading edge that is configured to contact the backside airflow diverter during at least a portion of the rotational motion. The pit is subject to spike increases in pressure initiated by the load clearing the rail car and entering the pit. The spike increases in pressure travel into the backside hood an attenuating distance from a primary hood intake before being attenuated. The attenuating distance is that distance from the primary hood intake at which the pressure within the backside hood is less than or equal to the pressure in the interbaffle space. The method includes locating at least one secondary air intake positioned to pass through the upper surface of the backside diverter into the backside hood at a location at least the attenuating distance from the primary hood intake.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 5 is an end view of the car dumper of FIG. 1 with a dumping frame beginning to rotate;

FIG. 7 is an end view of the car dumper of FIG. 1 with the dumping frame about midway in its rotation;

FIG. 7A is a detailed view of area 7A in FIG. 7;

FIG. 8A is a detailed view of area 8A in FIG. 8.

Figure 1:
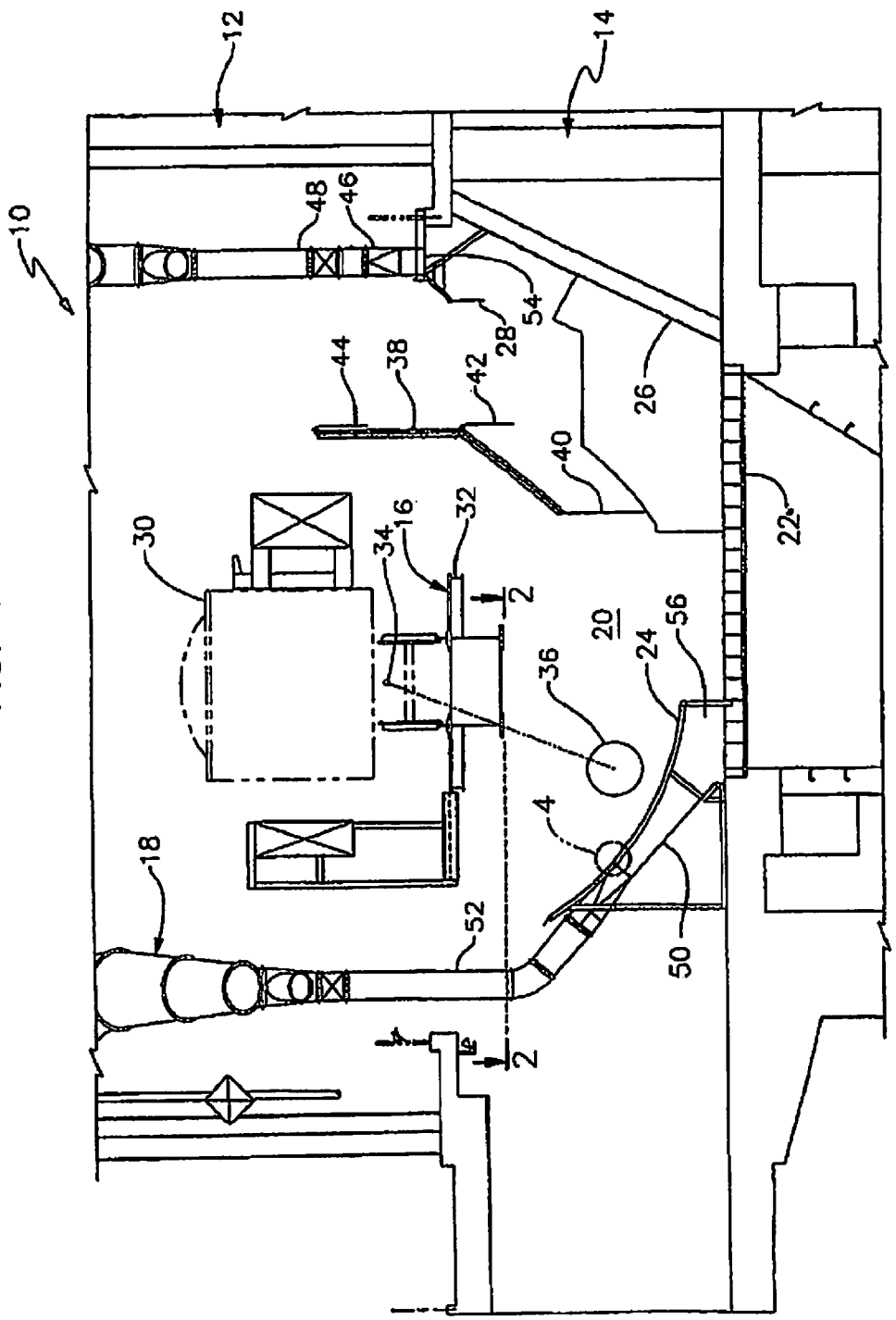
FIG. 1 is a fragmentary end elevational view of a rail car dumper in accordance with an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Car dumper facility 10 of the present invention generally includes upper portion 12 and lower portion 14. Rotational frame 16 is disposed within car dumper facility 10, generally overlapping upper portion 12 and lower portion 14.

Car dumper facility 10 also includes dust removal apparatus 18. Curved arrows in FIGS. 5, 5A, 6, 7, 7A, 8 and 8A demonstrate the general direction of airflow in accordance with the invention.

Lower portion 14, in an example embodiment, generally includes pit 20, grizzly 22, backside diverter 24, dumpside diverter 26 and dumpside baffle 28.

Pit 20 is covered by grizzly 22. Grizzly 22 is a grate having apertures of a size appropriate to receive the coal or other granular material dumped while not large enough to pass foreign matter that they be mixed with the dumped material. Backside diverter 24 is located in pit 20 on the backside and has a generally curved upper surface. Backside diverter 24 is also sometimes known as the ski jump because of its shape. Dumpside diverter 26 is located on the dumpside of pit 20 and is generally sloped toward grizzly 22 and extends upwardly away toward the exterior of pit 20. Dumpside baffle 28 is located on the dumpside of pit 20 and is generally stationary and secured to structure in or above pit 20.

Rotational frame 16 is rotationally disposed above pit 20 and is adapted to support rail car 30. Rotational frame 16 generally includes rail car support 32 positioned so that rotational axis 34 coincides with rotational coupler (not shown) of rail car 30. Rotational frame 16 generally includes counter weight 36 and baffle support 38. Baffle support 38, in an example embodiment, supports first baffle 40, second baffle 42 and third baffle 44. First baffle 40, second baffle 42 and third baffle 44 are flexible and/or are hingedly supported by baffle support 38. First baffle 40, second baffle 42 and third baffle 44 may be partially or completely formed of flexible material. For example, first baffle 40, second baffle 42 and third baffle 44 may be formed of a heavy weight flexible rubber or polymer material. Further, they may be formed of a ridged or semi-ridged structural material and have a flexible seal (not shown) at the lowest edge thereof.

Dust removal apparatus 18 generally includes dumpside hood 46, dump side ductwork 48, backside hood 50 and backside duct work 52. Dumpside hood 46 is generally located on the dumpside of car dumper facility 10. Dumpside hood 46, in an example embodiment, is positioned in upper portion 12 of car dumper facility 10. Dumpside hood 46 is in fluid communication with dump side ductwork 48. Dumpside ductwork 48 leads to an exhaust fan (not shown) which is coupled to a filtering facility (not shown) located in or near car dumper facility 10. Dumpside hood 46 includes dumpside intake 54. Dumpside intake 54 is located near and generally above dumpside diverter 26. Dumpside baffle 28 is located, in an example embodiment, adjacent to dumpside intake 54.

Figure 2:
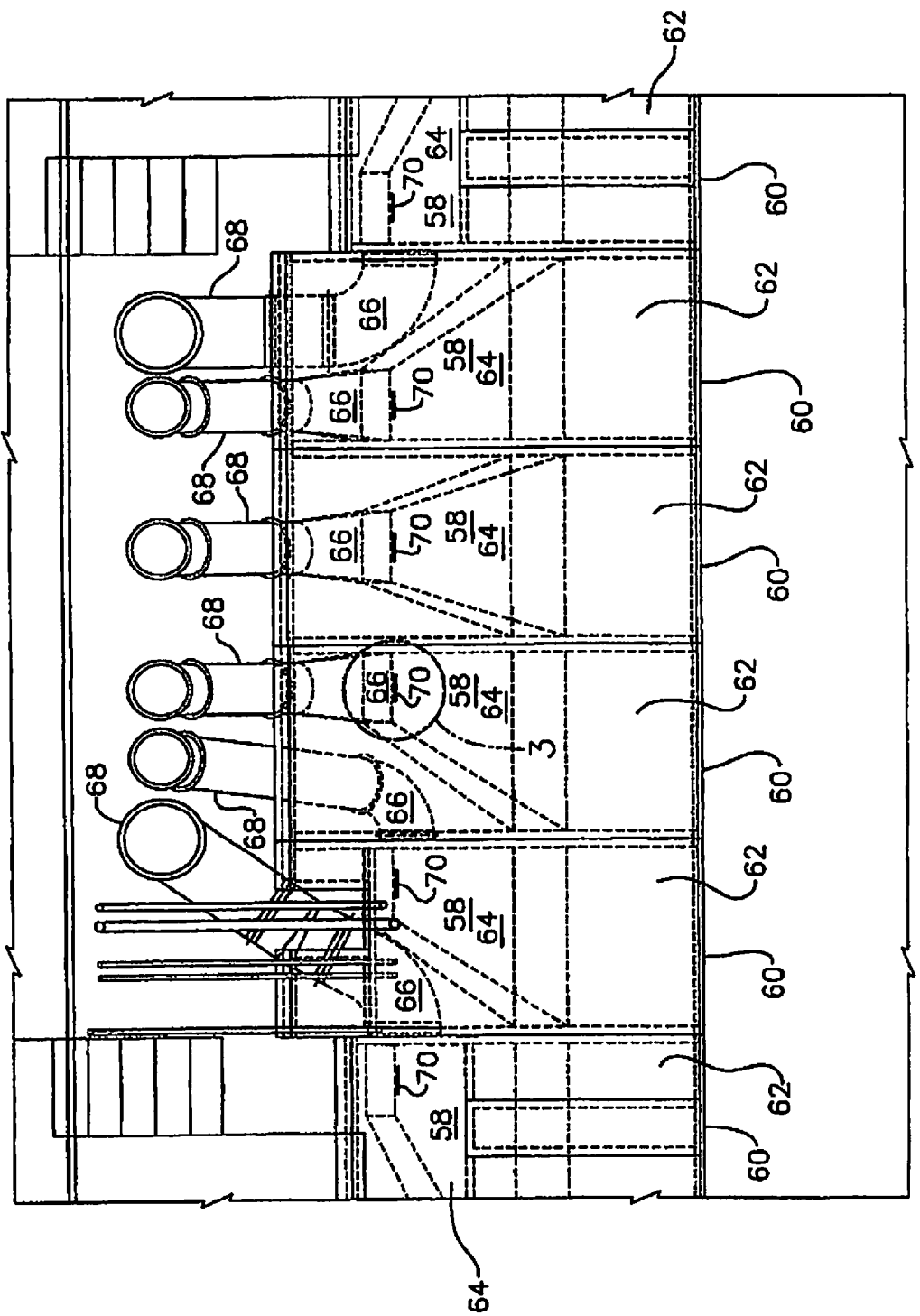
FIG. 2 is a top plan view of the car dumper of FIG. 1 taken along section line 2-2.

In an example embodiment, backside hood 50 is located generally beneath backside diverter 24. Backside hood 50 is in fluid communication with backside ductwork 52. Backside ductwork 52 is in fluid communication with exhaust fan (not shown) and filtering facility (not shown). As can be seen in FIGS. 1 and 2, backside hood 50, in an example embodiment, is located generally beneath backside diverter 24. Backside hood 50 includes backside intake 56. Backside intake 56 is located generally at the bottom of backside hood 50. In the example embodiment depicted in FIG. 1, backside intake 56 extends over a portion of grizzly 22.

Referring particular to FIG. 2, backside hood 50 may include a number of backside sub-hoods 58. In an example embodiment depicted in FIG. 2, six backside sub-hoods 58 are included. In FIG. 2, backside sub-hoods 58 are each located in bays 60. Generally, each backside sub-hood 58 includes straight portion 62, tapered portion 64, transition portion 66 and attached exhaust duct 68. In an example embodiment, straight portion 62 has generally parallel sides when viewed from above, tapered portion 64 tapers from straight portion 62 to transition portion 66. Both straight portion 62 and tapered portion 64 may tapered somewhat when viewed from the side. Transition portion 66 transitions in shape from a generally rectangular cross section of straight portion 62 and tapered portion 64 to the generally circular cross section of exhaust duct 68.

Each backside sub-hood 58 may include secondary intake 70. Secondary intake 70 comprises a fluid communication that passes through backside diverter 24 and into backside sub-hood 58. As depicted in FIG. 2, in an example embodiment, secondary intake 70 may be located approximately at the juncture between tapered portion 64 and transition portion 66, however, this should not be considered limiting.

Figure 3:
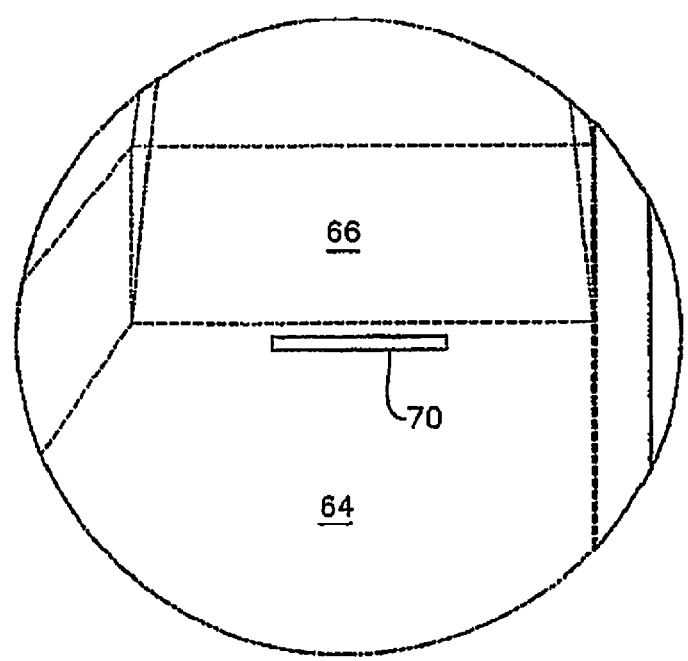
FIG. 3 is a detailed view of the area encircled at 3 in FIG. 2.
Figure 4:
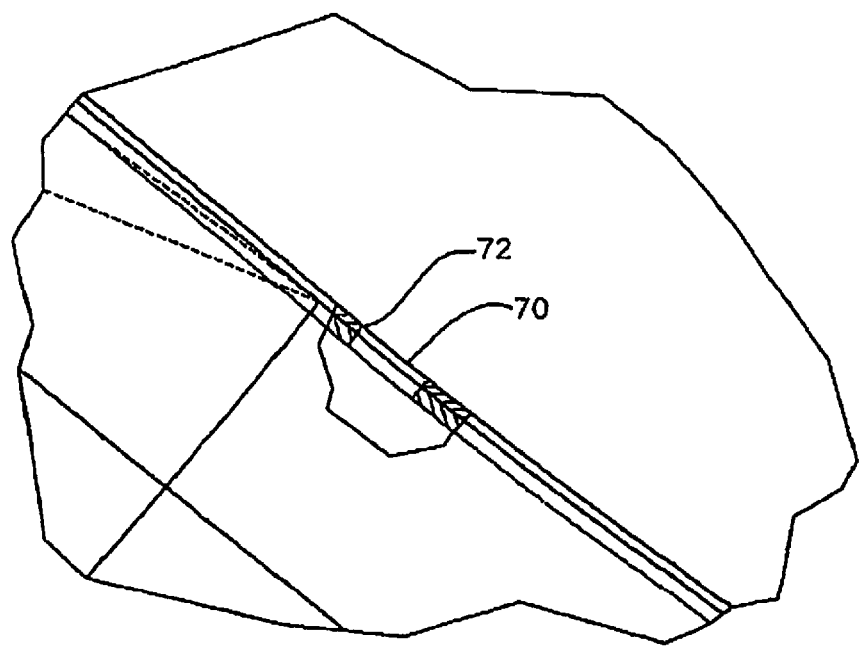
FIG. 4 is a detailed view of the area encircled at 4 in FIG. 1.
Figure 6:
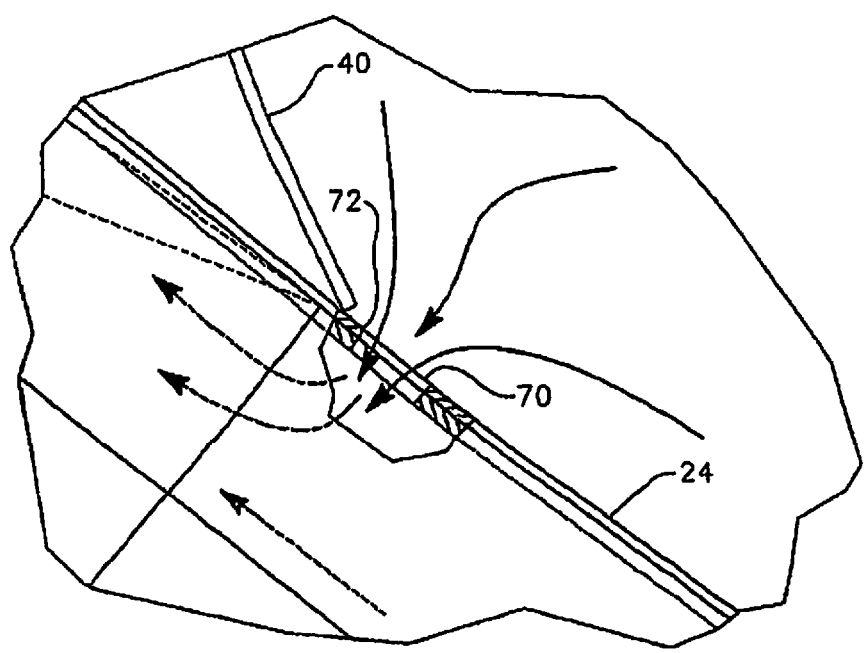
FIG. 6 is a detailed view of area 6 in FIGS. 5 and 5A.

Referring particularly to FIGS. 3, 4 and 6, secondary intake 70 allows fluid communication of backside sub-hood 58 with the space above, backside diverter 24. Secondary intake 70 may be generally slit shaped as depicted herein. However, this should not be considered limiting as secondary intake 70 may include other shapes including circular, square or rectangular. The secondary intake 70, in an example embodiment may, include a generally horizontal oriented rectangular slit. Secondary intake 70 may include chamfered edges 72.

Figure 5A:
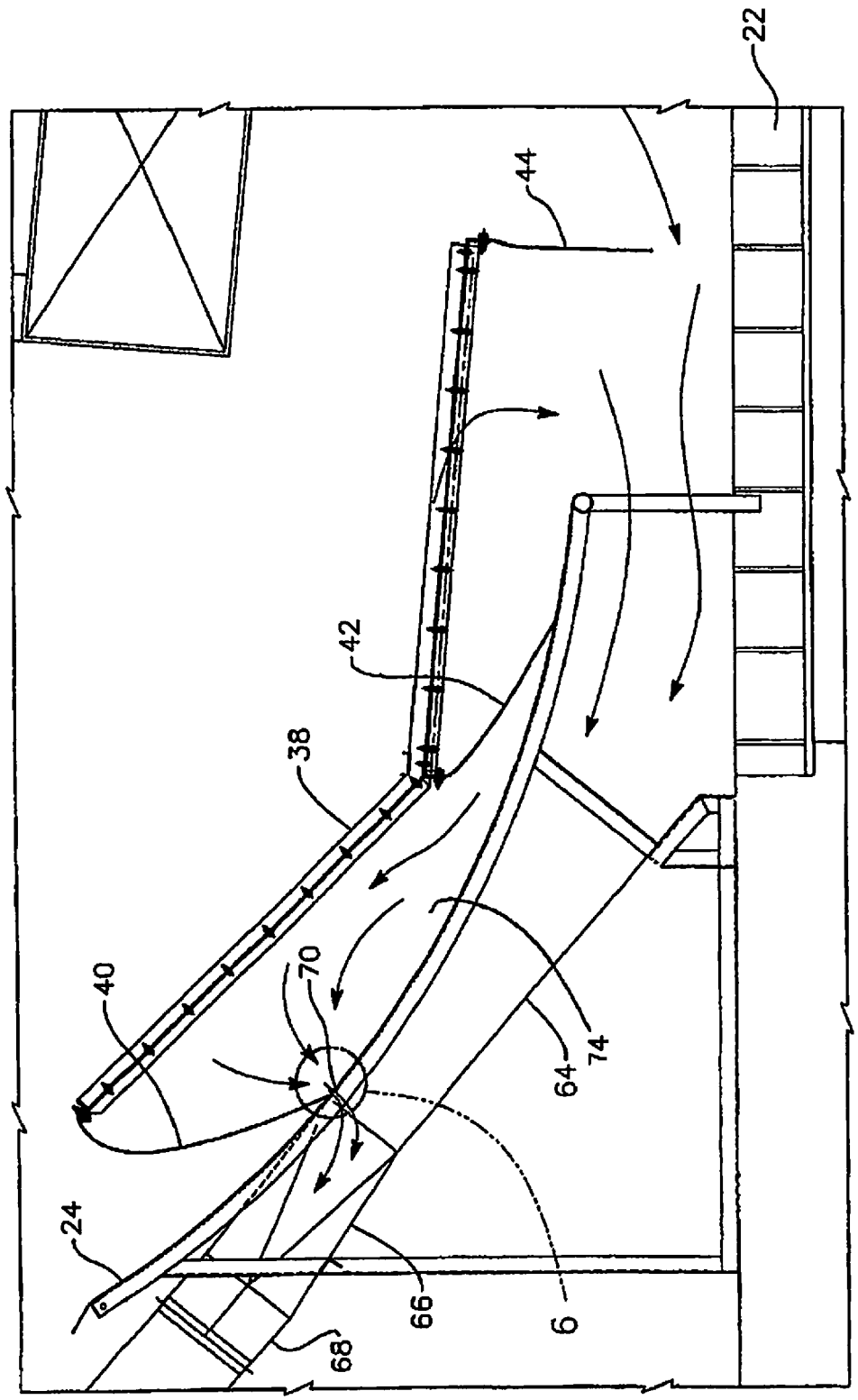
FIG. 5A is a detailed view of area 5A in FIG. 5.

Referring to FIGS. 5 and 5A, rotational frame 16 is depicted rotated approximately 90°, first baffle 40 and second baffle 42 is in contact with backside diverter 24. As depicted in FIGS. 5 and 5A, this contact creates first interbaffle space 74. First inter baffle space 74 is bounded by first baffle 40, second baffle 42, backside diverter 24 and baffle support 38. Secondary intake 70 is located so that first interbaffle space 74 is in fluid communication with backside hood 50, via backside sub-hood 58, when first baffle 40 and second baffle 42 are in contact with backside diverter 24.

Referring to FIGS. 7 and 7A, rotational frame 16 is pictured having rotated approximately 125°. At this stage in the rotation, first baffle 40 has cleared the upper edge of backside diverter 24. Second baffle 42 and third baffle 44 are in contact with backside diverter 24. Second interbaffle space 76 is thus bounded by second baffle 42, third baffle 44, dumpside diverter 26 and baffle support 38. Second interbaffle space 76, as depicted, is in fluid communication with backside hood 50 via secondary intake 70.

Figure 8:
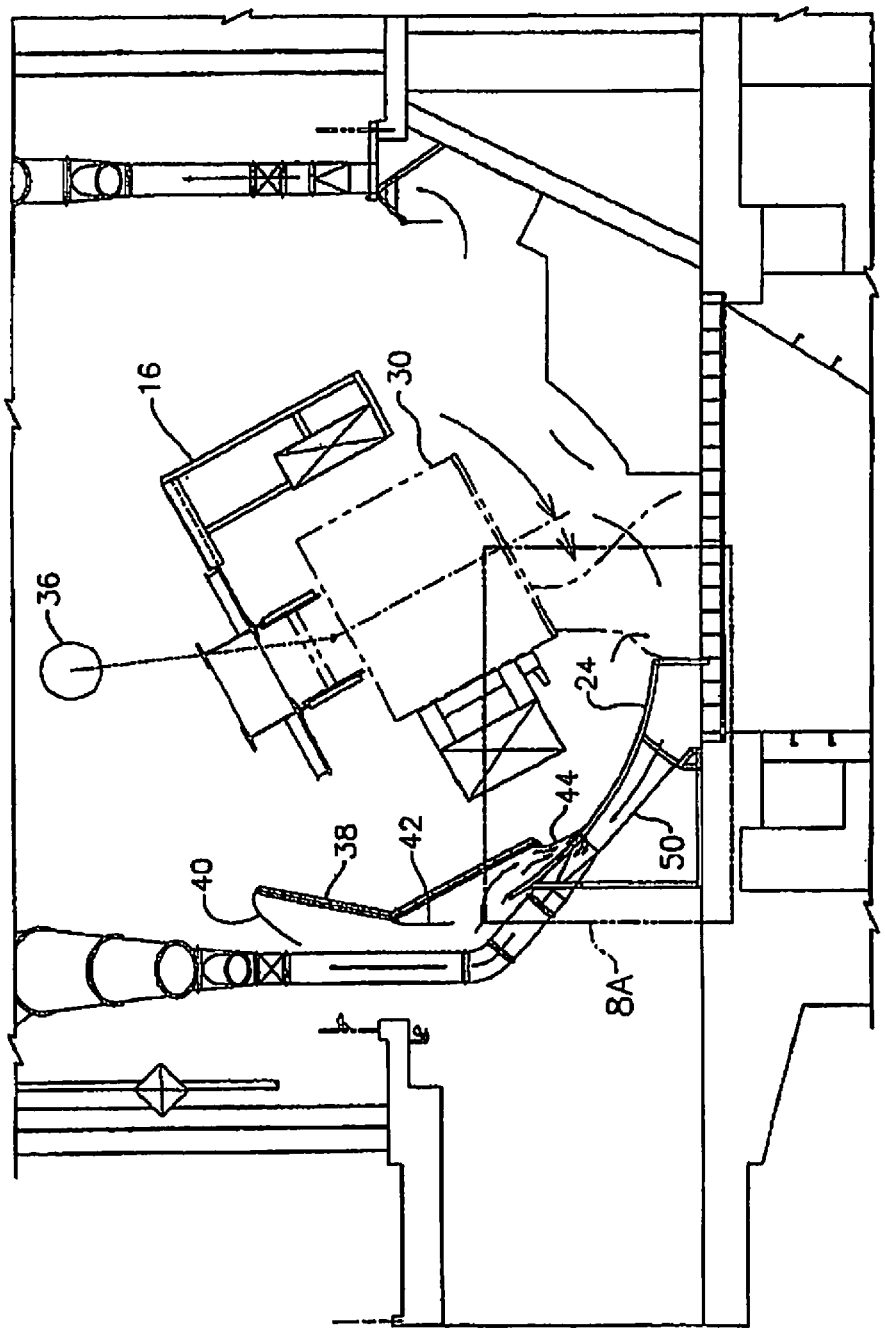
FIG. 8 is an end view of the car dumper of FIG. 1 with the dumping frame near the end of its rotation.

Referring to FIGS. 8 and 8A, rotational frame 16 is depicted having rotated approximately 155°. In this orientation, both first baffle 40 and second baffle 42 have cleared the upper edge of backside diverter 24. Third baffle 44 remains in contact with backside diverter 24. At this point of the rotation second interbaffle space 76 is opened to the air near upper portion 12 of car dumping facility 10.

In an example embodiment of the invention, secondary intake 70 is located relative to backside hood 50 at a location where pressure within backside hood 50 remains neutral or negative relative to the pressure within pit 20 when a load of granular material is being dumped from rail car 30 into pit 20. The dumping of granular material from rail car 30 brings along with it a rush of air that is carried along by the granular material as it departs rail car 30 and is carried by gravity into pit 20. This rush of air creates increased pressure in pit 20. Negative pressure is generally maintained within backside hood 50 and backside ductwork 52 because of the action of exhaust fans (not shown) in the filtering facility (not shown). As the rush of air that accompanies the granular material being dumped enters pit 20, pressure within pit 20 rises and pressure within the lower portion of backside hood 50 rises as well. There is a location within backside hood 50 and/or backside ductwork 52 at which pressure remains neutral or negative because of the action of exhaust fans (not shown).

In an example embodiment of the invention, secondary intakes 70 are located such that they are adjacent to the portion of backside hood 50 at which air pressure remains neutral or negative relative to the elevated pressure in pit 20 caused by the dumping of granular material. Additionally, secondary intake 70 being located at this location allows secondary intake 70 to facilitate the evacuation of dust laden air from first interbaffle space 74 when secondary intake 70 is in fluid communication with first interbaffle space 74 and from secondary interbaffle space 76 when secondary intake 70 is in fluid communication with second interbaffle space 76.

Referring to FIGS. 5, 5A, 7, 7A and 8-8A, in operation, rail car 30 is indexed within rotational frame 16 as depicted in FIG. 1. Rail car 30 is secured to rotational frame 16 and rotational frame 16 begins rotating as depicted in FIG. 5. As rotational frame 16 and rail car 30 rotate, granular material (not shown) within rail car 30 begins dump into pit 20. As rotational frame 16 continues to rotate as depicted in FIGS. 5, 5A, 7, 7A, and 8, 8A, granular material (not shown) continues to pour from rail car 30 into pit 20.

As granular material (not shown) pours from rail car 30 into pit 20, the pressure within pit 20 rises because of the on rush of air carried along with the granular material (not shown). Referring to FIGS. 5 and 5A, when rotational frame 16 reaches a certain point in rotation, fluid communication is established between secondary intake 70 and first interbaffle space 74. At this point, first interbaffle space 74 may be filled with dust laden air from the dumping of granular material from rail car 30 in the pit 20. Dust laden air is then withdrawn from interbaffle space 74 into backside hood 50 because of the relatively lower pressure in backside hood 50.

As rotation of rotational frame 16 continues, as depicted in FIGS. 7 and 7A, second interbaffle space 76 establishes fluid communication with secondary intake 70. Because secondary intake 70 is located relative to backside hood 50, where internal pressure in backside hood 50 remains neutral or negative relative to pit 20 as second interbaffle space 76, dust laden air is withdrawn from second interbaffle space 76. Because dust laden air has been withdrawn from first interbaffle space 74, no puff of dust laden air is released from first interbaffle space 74 when it reaches the position depicted in FIGS. 7 and 7A. Further no puff of dust laden air escapes from second interbaffle space 76 when it reaches the position depicted in FIGS. 8 and 8A. Thus, the present invention prevents or reduces the release of environmental contaminants from pit 20 in car dumper facility 10.

Rotational frame 16 carrying empty rail car 30 then can be returned to the upright position as depicted in FIG. 1 and removed from the car dumper facility 10 so that another rail car 30 that is loaded may be indexed for dumping.

The invention may be embodied in other specific forms without departing from the spirit of the essential attributes thereof, therefore, the illustrated embodiments should be considered in all respects as illustrative and not restrictive, reference being made to the appended claims rather than to the forgoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A dust isolating enclosure for use in an apparatus for rotary dumping of rail cars, comprising:
   three flexible baffles suspended from a rotary dumping structure, the three baffles including a first flexible baffle, a second flexible baffle and a third flexible baffle each extending downwardly under the influence of gravity from the rotary dumping structure and being spaced evenly apart from one another by a separation distance;
   a diverter having a concave curved upper surface, a concavity of the concave curved upper surface being such that a lower edge of two of the three flexible baffles is in contact with the concave curved upper surface during a portion of rotary motion of the rotary dumping structure thereby at least partially enclosing a first volume between the first flexible baffle, the second flexible baffle, the concave upper surface and a first portion of the rotary dumping structure during a first portion of the rotary motion and thereby at least partially enclosing a second volume between the second flexible baffle, the third flexible baffle, the concave upper surface and a second portion of the rotary dumping structure during a second portion of the rotary motion; and
   the diverter having an intake opening passing through the concave curved upper surface and the intake opening being positioned such that operable fluid communication is established between the first volume and an exhaust fan during the first portion of the rotary motion and such that operable fluid communication is established between the second volume and the exhaust fan during the second portion of the rotary motion whereby dust laden air is withdrawn from the first volume and the second volume sequentially.

2. The dust isolating enclosure as claimed in claim 1, wherein the intake opening is further in operable fluid communication with the exhaust fan via at least one exhaust hood located beneath the diverter.

3. The dust isolating enclosure as claimed in claim 1, wherein the intake opening is further slit shaped and oriented such that a long axis of the slit shape is oriented horizontally.

4. The dust isolating enclosure as claimed in claim 1, wherein the intake opening comprises chamfered edges.

5. The dust isolating enclosure as claimed in claim 1, wherein the intake opening is located a distance from a lower edge of the concave curved upper surface that is equal to or greater than the separation distance.

6. The dust isolating enclosure as claimed in claim 1, wherein the intake opening is located such that a first lower edge of the first flexible baffle passes the intake opening after a second lower edge of the second flexible baffle has made contact with a lower edge of the upper surface of the diverter.

7. The dust isolating enclosure as claimed in claim 1, wherein the intake opening is located such that the lower edge of the second flexible baffle passes the intake opening after a lower edge of the third flexible baffle has made contact with the lower edge of the upper surface of the diverter.

8. The dust isolating enclosure as claimed in claim 1, wherein the intake opening is sized to facilitate evacuation of the first volume from between the first flexible baffle and the second flexible baffle prior to the first flexible baffle breaking contact with an upper edge of the diverter or sized to facilitate evacuation of the second volume from between the second flexible baffle and the third flexible baffle prior to the second flexible baffle breaking contact with the upper edge of the diverter.

9. The dust isolating enclosure as claimed in claim 1, wherein the intake opening is located to pass through the concave curved upper surface of the diverter at a location at least an attenuating distance from a primary intake.

10. The dust isolating enclosure as claimed in claim 1, wherein the intake opening is located and sized such that the dust laden air is drawn through the intake opening and removed from the first volume prior to the first baffle clearing an upper edge of the concave upper surface and such that dust laden air is drawn through the intake opening and removed from the second volume prior to the second baffle clearing an upper edge of the concave upper surface thereby mitigating release of the dust laden air into a surrounding environment.

11. A method of making a dust isolating enclosure for use in an apparatus for rotary dumping of rail cars, comprising:
   suspending three flexible baffles from a rotary dumping structure, including a first flexible baffle, a second flexible baffle and a third flexible baffle such that each of the three flexible baffles extends downwardly under the influence of gravity from the rotary dumping structure;
   spacing the three flexible baffles evenly apart from one another by a separation distance;
   positioning a diverter having a concave curved upper surface beneath the rotary dumping structure with a concavity of the concave curved upper surface being positioned such that a lower edge of two of the three flexible baffles is in contact with the concave curved upper surface during a portion of rotary motion of the rotary dumping structure thereby at least partially enclosing a first volume between the first flexible baffle, the second flexible baffle, the concave upper surface and a first portion of the rotary dumping structure during a first portion of the rotary motion and thereby at least partially enclosing a second volume between the second flexible baffle, the third flexible baffle, the concave upper surface and a second portion of the rotary dumping structure during a second portion of the rotary motion; and
   creating an intake opening passing through the concave curved upper surface and positioning the intake opening such that operable fluid communication is established between the first volume and an exhaust fan during the first portion of the rotary motion and such that operable fluid communication is established between the second volume and the exhaust fan during the second portion of the rotary motion whereby dust laden air is withdrawn from the first volume and the second volume sequentially.

12. The method as claimed in claim 11, further comprising coupling the intake opening in operable fluid communication with the exhaust fan via at least one exhaust hood located beneath the diverter.

13. The method as claimed in claim 11, further comprising making the intake opening slit shaped and oriented such that a long axis of the slit shape is oriented horizontally.

14. The method as claimed in claim 11, further comprising making the intake opening comprise chamfered edges.

15. The method as claimed in claim 11, further comprising locating the intake opening such that a first lower edge of the first flexible baffle passes the intake opening after a second lower edge of the second flexible baffle has made contact with a lower edge of the upper surface of the diverter.

16. The method as claimed in claim 11, further comprising locating the intake opening such that a second lower edge of the second flexible baffle passes the intake opening after a third lower edge of the third flexible baffle has made contact with a lower edge of the upper surface of the diverter.

17. The method as claimed in claim 11, further comprising sizing the intake opening to facilitate evacuation of the first volume from between the first flexible baffle and the second flexible baffle prior to the first flexible baffle breaking contact with an upper edge of the concave upper surface or sizing the intake to facilitate evacuation of the second volume from between the second flexible baffle and the third flexible baffle prior to the second flexible baffle breaking contact with the upper edge of the concave upper surface.

18. The method as claimed in claim 11, further comprising locating the intake opening to pass through the concave curved upper surface of the diverter at a location at least an attenuating distance from a primary intake.

19. The method as claimed in claim 11, further comprising locating and sizing the intake opening such that the dust laden air is drawn through the intake opening and removed from the first volume prior to the first baffle clearing an upper edge of the concave upper surface and such that dust laden air is drawn through the intake opening and removed from the second volume prior to the second baffle clearing an upper edge of the concave upper surface thereby mitigating release of the dust laden air into a surrounding environment.

\* \* \* \* \*